(12) United States Patent  
Yamashita (10) Patent No.: US 9,094,736 B2
(45) Date of Patent: Jul. 28, 2015

(54) INFORMATION PROCESSING APPARATUS, INFORMATION PROCESSING METHOD, AND PROGRAM

(75) Inventor: Yumi Yamashita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 314 days.

(21) Appl. No.: 12/477,273

(22) Filed: Jun. 3, 2009

(65) Prior Publication Data

US 2009/0313649 A1   Dec. 17, 2009

(30) Foreign Application Priority Data

Jun. 13, 2008 (JP) ................................ 2008-154836

(51) Int. Cl.
| | |
|---|---|
| H04H 60/33 | (2008.01) |
| H04N 5/445 | (2011.01) |
| G06F 7/00 | (2006.01) |
| G06F 17/30 | (2006.01) |
| H04N 21/8405 | (2011.01) |
| H04N 5/44 | (2011.01) |
| H04N 21/434 | (2011.01) |
| H04N 21/442 | (2011.01) |
| H04N 21/45 | (2011.01) |
| H04N 21/466 | (2011.01) |
| H04N 21/482 | (2011.01) |

(52) U.S. Cl.
CPC ............ *H04N 21/8405* (2013.01); *H04N 5/44* (2013.01); *H04N 5/445* (2013.01); *H04N 21/4348* (2013.01); *H04N 21/44222* (2013.01); *H04N 21/4532* (2013.01); *H04N 21/4667* (2013.01); *H04N 21/482* (2013.01); *H04N 2005/4444* (2013.01)

(58) Field of Classification Search
CPC . H04N 21/482; H04N 21/4828; H04N 21/84; H04N 21/8405
See application file for complete search history.

(56) References Cited

U.S. PATENT DOCUMENTS

| | | | |
|---|---|---|---|
| 6,581,207 B1 * | 6/2003 | Sumita et al. .................... | 725/46 |
| 7,836,039 B2 * | 11/2010 | Clark et al. ..................... | 707/706 |
| 2001/0039656 A1 | 11/2001 | Nakamura et al. | |
| 2002/0157096 A1 | 10/2002 | Hane et al. | |
| 2002/0199193 A1 | 12/2002 | Gogoi et al. | |
| 2006/0010464 A1 | 1/2006 | Azami | |
| 2006/0282258 A1 * | 12/2006 | Tsuzuki et al. ................. | 704/10 |
| 2007/0288964 A1 | 12/2007 | Horiguchi | |
| 2008/0295132 A1 * | 11/2008 | Icho et al. ....................... | 725/46 |

FOREIGN PATENT DOCUMENTS

| | | |
|---|---|---|
| JP | 2006-50322 | 2/2006 |
| JP | 2007-208365 | 8/2007 |
| JP | 2008-92216 | 4/2008 |
| JP | 2008-199406 | 8/2008 |
| WO | WO 02/11446 A2 | 2/2002 |
| WO | WO 02/11446 A3 | 2/2002 |

* cited by examiner

*Primary Examiner* — Nathan Flynn
*Assistant Examiner* — James R Marandi
(74) *Attorney, Agent, or Firm* — Oblon, McClelland, Maier & Neustadt, L.L.P.

(57) ABSTRACT

Disclosed herein is an information processing apparatus, including: an acquisition section configured to, based on taste information representing taste of a user and learned beforehand, acquire related data related to the taste information; an extraction section configured to extract a keyword from the acquired related data; and a learning section configured to learn a new piece of the taste information based on the extracted keyword.

17 Claims, 5 Drawing Sheets

FIG.2

| KEYWORD | TASTE DEGREE |
|---|---|
|  |  |
|  |  |
|  |  |
| ⋮ | ⋮ |

TASTE INFORMATION LIST

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program. In particular, the present invention relates to an information processing apparatus, an information processing method, and a program which allow more wide-ranging learning of taste information representing taste of a user to be achieved with a relatively small amount of information, for example.

2. Description of the Related Art

For example, a technique has been proposed for displaying, on a display device, a title and the like of a recommended program, as recommended based on the taste of the user, and information related to the recommended program, thereby presenting the user therewith (see Japanese Patent Laid-open No. 2006-50322, for example).

Specifically, according to the known technique, the taste of the user is learned based on various types of history data, such as data about a history of programs selected and viewed by the user, and electronic program guide (EPG) data, and based on the learned taste of the user, the title and the like of the recommended program for the user are extracted from the EPG data.

Also, according to the known technique, the title and the like of the recommended program as extracted from the EPG data are used as a search condition to perform a search in a program information providing server as managed by a program information providing company for information related to the recommended program, so that the related information is acquired from the program information providing server.

Then, the title and the like of the recommended program as extracted from the EPG data and the information related to the recommended program as acquired from the program information providing server are displayed on the display device to be presented to the user.

SUMMARY OF THE INVENTION

Suppose that the user has selected a variety show program in which male celebrity "A" appears, for example. In this case, according to the known technique, keyword "A" will be learned as a keyword concerning the taste of the user.

Then, based on the result of the learning of the taste of the user, drama program "X," in which the male celebrity "A" appears, is extracted as a recommended program from the EPG data, for example, and displayed on the display device along with information related to the recommended program.

When "A" is a keyword concerning the taste of the user, the drama program "X," in which the male celebrity "A" appears, and other things related to the male celebrity "A" often concern the taste of the user.

Specifically, suppose that the male celebrity "A" belongs to idol group "G" and the keyword "A" concerns the taste of the user, for example. In this case, the keyword "G," which is related to "A," also often concerns the taste of the user.

In the present case, only the keyword "A" has been learned as a keyword concerning the taste of the user.

Therefore, according to the known technique, although the drama program "X" as a recommended program, in which the male celebrity "A" appears, and the information related to the recommended program are displayed on the display device, a program related to the idol group "G," to which the male celebrity "A" belongs, may not be chosen as a recommended program and therefore not be displayed on the display device.

The embodiments of the present invention address the above-identified, and other problems associated with known methods and apparatuses, and allows wide-ranging learning of the taste information representing the taste of the user to be achieved with a relatively small amount of information obtained as a result of program selection by the user and the like.

According to an embodiment of the present invention, there is provided an information processing apparatus including: acquisition means for, based on taste information representing taste of a user and learned beforehand, acquiring related data related to the taste information; extraction means for extracting a keyword from the acquired related data; and learning means for learning a new piece of the taste information based on the extracted keyword.

According to another embodiment of the present invention, there is provided an information processing method employed in an information processing apparatus that learns taste information representing taste of a user, the information processing apparatus including acquisition means, extraction means, and learning means, the method including the steps of: the acquisition means acquiring, based on the taste information representing the taste of the user and learned beforehand, related data related to the taste information; the extraction means extracting a keyword from the acquired related data; and the learning means learning a new piece of the taste information based on the extracted keyword.

According to yet another embodiment of the present invention, there is provided a program for allowing a computer to function as: acquisition means for, based on taste information representing taste of a user and learned beforehand, acquiring related data related to the taste information; extraction means for extracting a keyword from the acquired related data; and learning means for learning a new piece of the taste information based on the extracted keyword.

According to an embodiment of the present invention, based on taste information representing taste of a user and learned beforehand, related data related to the taste information is acquired; a keyword is extracted from the acquired related data; and a new piece of the taste information is learned based on the extracted keyword.

According to the embodiments of the present invention, wide-ranging learning of the taste information representing the taste of the user is possible with a relatively small amount of information obtained as a result of program selection by the user and the like.

DETAILED DESCRIPTION OF THE PREFERRED EMBODIMENTS

Hereinafter, preferred embodiments of the present invention will be described with reference to the accompanying drawings.

Figure 1:
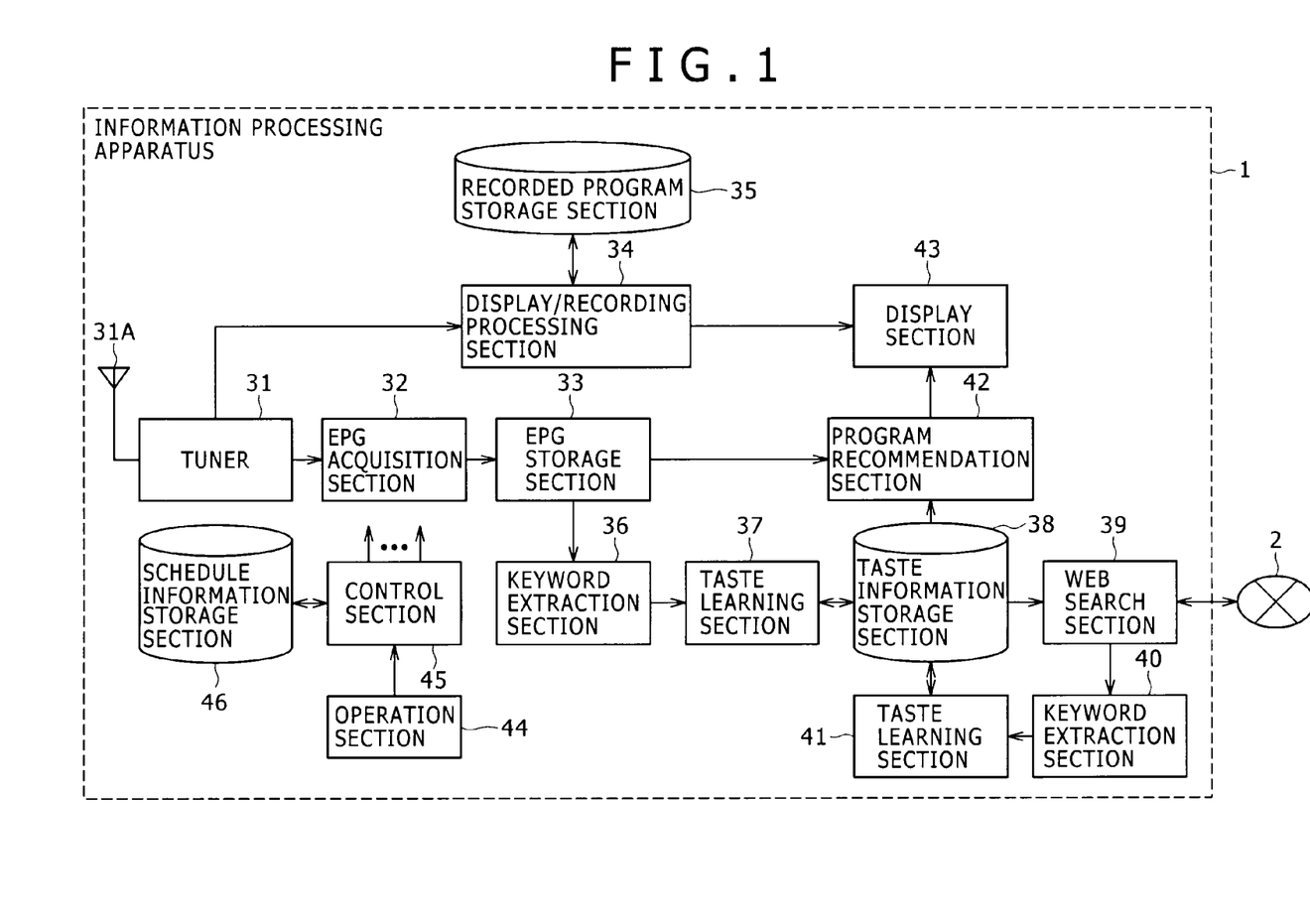
FIG. 1 is a block diagram illustrating an exemplary structure of an information processing apparatus according to an embodiment of the present invention.

FIG. 1 illustrates an information processing apparatus 1 according to an embodiment of the present invention.

The information processing apparatus 1 includes a tuner 31 with an antenna 31A, an EPG acquisition section 32, an EPG storage section 33, a display/recording processing section 34, a recorded program storage section 35, a keyword extraction section 36, a taste learning section 37, a taste information storage section 38, a Web search section 39, a keyword extraction section 40, a taste learning section 41, a program recommendation section 42, a display section 43, an operation section 44, a control section 45, and a schedule information storage section 46.

Based on a channel selecting operation by a user, for example, the tuner 31 adjusts a channel (frequency band) to be received via the antenna 31A, to receive a television signal (broadcast wave) corresponding to a desired channel. The tuner 31 extracts image data (including audio data) included in the received television signal, and supplies the extracted data to the display/recording processing section 34.

In addition, the tuner 31 extracts EPG data broadcast as a television signal, and supplies the extracted EPG data to the EPG acquisition section 32.

The EPG acquisition section 32 acquires the EPG data from the tuner 31, and supplies the EPG data to the EPG storage section 33 to be stored therein.

The EPG storage section 33 stores (holds) the EPG data supplied from the EPG acquisition section 32. The EPG data includes text data representing a title of a program, a person that appears in the program, detailed information about the program, and so on.

The display/recording processing section 34 supplies the image data supplied from the tuner 31 to the display section 43 to allow an image corresponding to the image data to be displayed.

In addition, in response to a recording operation by the user, for example, the display/recording processing section 34 supplies, as a recorded program, the image data supplied from the tuner 31 to the recorded program storage section 35 to be stored therein. Further, in response to a playback operation by the user, for example, the display/recording processing section 34 reads, from the recorded program storage section 35, the recorded program as specified by the user, and supplies the recorded program to the display section 43 to be displayed.

The recorded program storage section 35 stores the recorded program supplied from the display/recording processing section 34.

When viewing (selecting) of a program, recording of a program, scheduling of recording of a program, or the like has been performed, for example, the keyword extraction section 36 reads EPG data corresponding to that program from the EPG data storage section 33. In addition, the keyword extraction section 36 extracts a keyword from the read EPG data via morphological analysis or the like, and supplies the extracted keyword to the taste learning section 37 as a learning-use keyword.

Based on the learning-use keyword supplied from the keyword extraction section 36, the taste learning section 37 learns taste information representing taste of the user, and supplies a taste information list obtained as a result of the learning to the taste information storage section 38 to be stored therein. This process will be referred to as a "taste information list learning process."

Specifically, in the case where the learning-use keyword has not been registered in the taste information list stored in the taste information storage section 38 yet, for example, the taste learning section 37 registers, in the taste information list, the learning-use keyword and a taste degree representing the degree of the taste of the user for the learning-use keyword as taste information. Note that as the taste degree, which is registered together with the keyword, a predetermined default value is registered, for example.

Meanwhile, in the case where the learning-use keyword has already been registered in the taste information list stored in the taste information storage section 38, the taste learning section 37 updates the taste degree for the keyword already registered in the taste information list.

The taste information storage section 38 stores the taste information list in which the taste information is registered.

Figure 2:
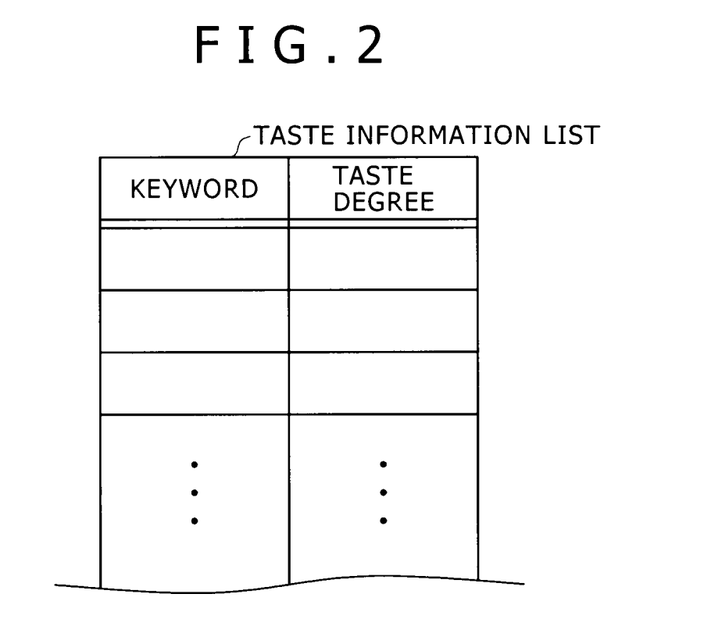
FIG. 2 illustrates an exemplary taste information list.

FIG. 2 illustrates an exemplary taste information list stored in the taste information storage section 38.

In the taste information list as illustrated in FIG. 2, keywords concerning the taste of the user and the taste degree of the user for each of the keywords are registered as the taste information in a correlated manner.

Note that the taste learning section 37 updates the taste degree for any given keyword such that the taste degree for that keyword will increase with an increasing frequency of the extraction of that keyword from the EPG data. Accordingly, keywords with higher values of the taste degree can be considered as keywords that concern the taste of the user more greatly.

Returning to FIG. 1, the Web search section 39 reads, from the taste information storage section 38, a keyword for which the taste degree of the user as registered in the taste information list obtained as a result of the taste information list learning process performed by the taste learning section 37 is equal to or greater than a predetermined threshold, as a search-use keyword.

For each search-use keyword, the Web search section 39 acquires related data related to that search-use keyword via the Internet 2, and supplies the acquired related data to the keyword extraction section 40.

Specifically, suppose that the search-use keyword is the title of a program, for example. In this case, the Web search section 39 retrieves (acquires), as related data related to the title of that program, text data representing an official home page of that program from a server or the like used to provide information about that program via the Internet 2, and supplies the retrieved data to the keyword extraction section 40.

Also, suppose that the search-use keyword is a name of a person who appears in a program, for example. In this case, the Web search section 39 retrieves, as related data related to the name of the person who appears in that program, text data representing an official home page of that person from a server or the like used to provide information about that person via the Internet 2, and supplies the retrieved data to the keyword extraction section 40.

The keyword extraction section 40 extracts a keyword from the related data supplied from the Web search section 39 via the morphological analysis or the like, and supplies the extracted keyword to the taste learning section 41 as a learning-use keyword.

Similar to the taste learning section 37, the taste learning section 41 generates a new taste information list based on the learning-use keyword supplied from the keyword extraction section 40, and supplies the new taste information list to the taste information storage section 38 to be stored therein.

Figure 3:
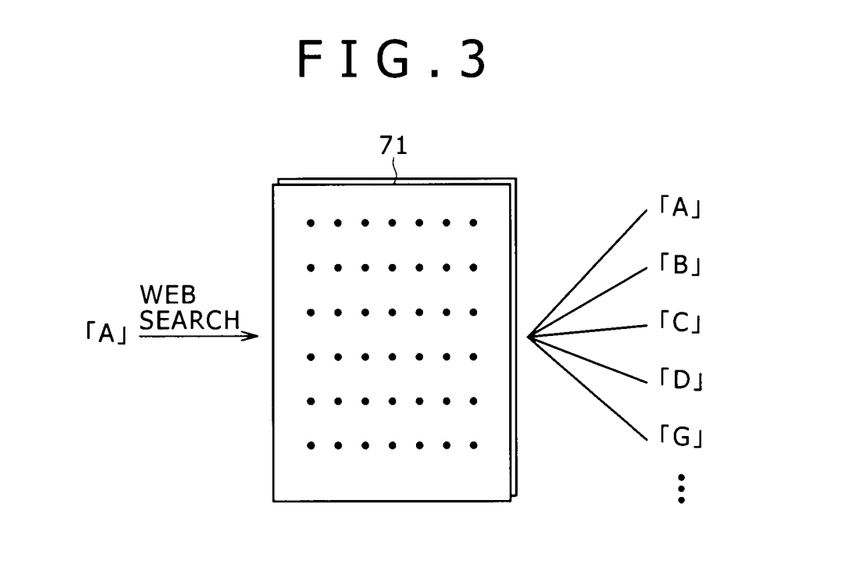
FIG. 3 is a diagram for specifically explaining a process performed by a Web search section, a keyword extraction section, and a taste learning section.

Next, referring to FIG. 3, a process performed by the Web search section 39, the keyword extraction section 40, and the taste learning section 41 will now be described in detail below.

For example, suppose that the Web search section 39 has read, from the taste information storage section 38, the name of male celebrity "A" as a keyword for which the taste degree of the user is equal to or greater than the predetermined threshold. In this case, the Web search section 39 searches for an official home page of the male celebrity "A" and so on via the Internet 2, and supplies related data 71 representing the official home page of the male celebrity "A" and so on as obtained by the search to the keyword extraction section 40.

Note that the number of keywords read from the taste information storage section 38 is not limited to one. Multiple keywords may be read from the taste information storage section 38.

Suppose that the male celebrity "A" belongs to idol group "G," whose other members are male celebrities "B," "C," and "D." Accordingly, the related data 71 will involve relatively many instances of keywords such as "B", "C," "D," and "G" as well as the keyword "A," as keywords related to "A."

The keyword extraction section 40 extracts, via the morphological analysis or the like, the keywords such as "A," "B." "C," "D," and "G" from the related data 71 supplied from the Web search section 39, and supplies the extracted keywords to the taste learning section 41.

Based on the keywords such as "A," "B," "C," "D," and "G" supplied from the keyword extraction section 40, the taste learning section 41 generates the new taste information list, and supplies the new taste information list to the taste information storage section 38 to be stored therein.

Returning to FIG. 1, the program recommendation section 42 reads the new taste information list stored in the taste information storage section 38, and, based on the new taste information list, reads EPG data corresponding to a recommended program for the user from the EPG storage section 33. Then, the program recommendation section 42 supplies the EPG data to the display section 43 to allow detailed information about the recommended program and so on to be displayed.

The operation section 44 includes: a start button used to initiate the process performed by the Web search section 39, the keyword extraction section 40, and the taste learning section 41; a channel button used to change the channel for a program to be viewed; a recording button used to record a program; a playback button used to play a recorded program; operation keys used in conjunction with the recording button to schedule the recording of a program; and so on. The operation section 44 is operated by the user.

In response to a user operation, the operation section 44 supplies an operation signal corresponding to the user operation to the control section 45.

The control section 45 controls various functional blocks in accordance with the operation signal supplied from the operation section 44. Specifically, in the case where the user performs an operation of scheduling a recording, for example, the control section 45 generates recording schedule information representing information necessary for the recording such as a start time and a channel of the program to be recorded, in accordance with the operation signal supplied from the operation section 44, and supplies the recording schedule information to the schedule information storage section 46 to be stored therein.

In addition, based on the schedule information stored in the schedule information storage section 46, the control section 45 controls the tuner 31, the display/recording processing section 34, and so on to start recording the desired program when the start time of the desired program has come.

The schedule information storage section 46 stores the recording schedule information supplied from the control section 45.

Figure 4:
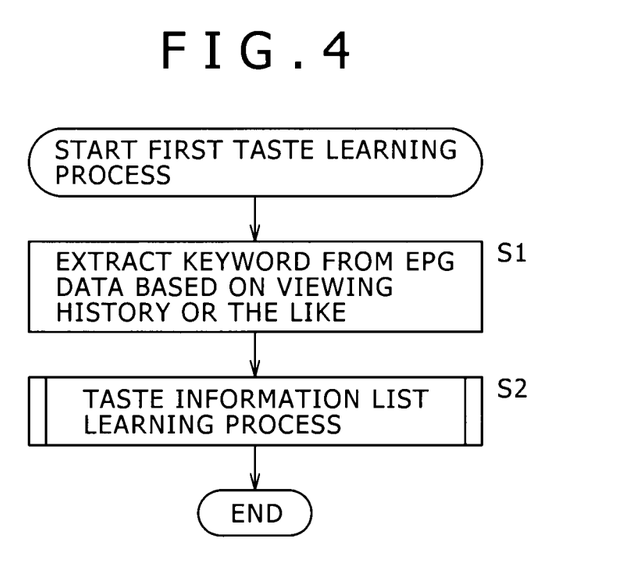
FIG. 4 is a flowchart illustrating a first taste learning process.

Next, referring to a flowchart of FIG. 4, a first taste learning process will now be described below.

When the user has operated the channel button or the like on the operation section 44 to perform the viewing of the program, the recording of the program, the scheduling of the recording of the program, or the like, for example, the operation signal corresponding to the user operation is supplied from the operation section 44 to the control section 45, and the control section 45 controls the keyword extraction section 36 and the taste learning section 37 based on the operation signal supplied from the operation section 44 to perform the first taste learning process.

At step S1, the keyword extraction section 36 reads, from the EPG data storage section 33, the EPG data about the program which the user has viewed, for example. Then, the keyword extraction section 36 extracts the keyword from the read EPG data via the morphological analysis or the like, and supplies the extracted keyword to the taste learning section 37 as the learning-use keyword.

At step S2, based on the learning-use keyword supplied from the keyword extraction section 36, the taste learning section 37 learns the taste of the user, and supplies the taste information list obtained as a result of the learning to the taste information storage section 38 to be stored therein. This process is referred to as the taste information list learning process. Thus, the first taste learning process is completed.

Figure 5:
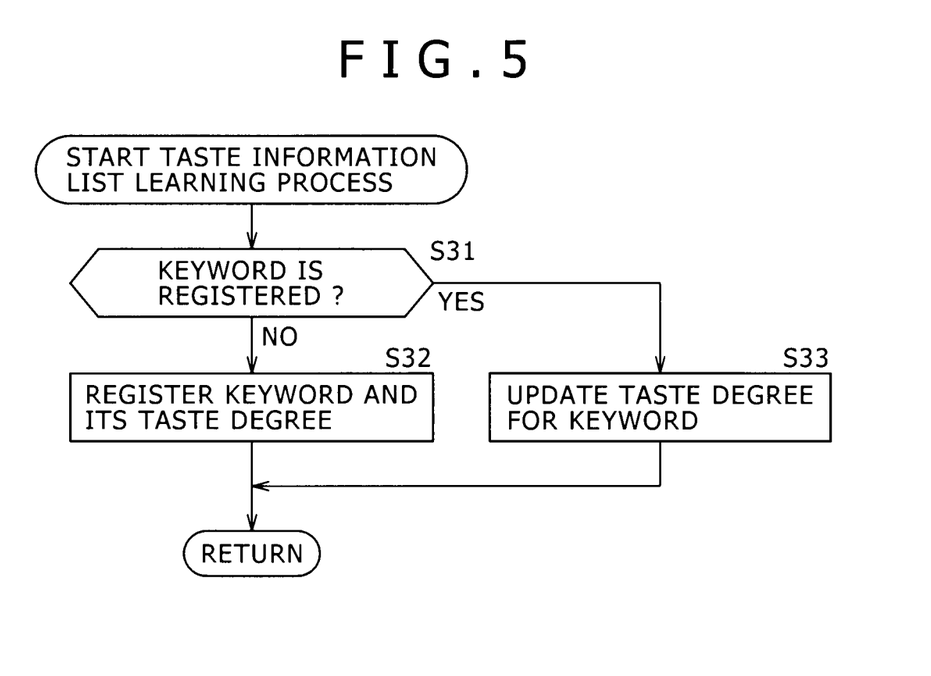
FIG. 5 is a flowchart illustrating a taste information list learning process.

Next, referring to a flowchart of FIG. 5, the taste information list learning process performed at step S2 in FIG. 4 will now be described in detail below.

At step S31, the taste learning section 37 reads, from the taste information storage section 38, the taste information list stored in the taste information storage section 38, and determines whether or not the learning-use keyword supplied from the keyword extraction section 36 is registered in the read taste information list.

If the taste learning section 37 determines at step S31 that the learning-use keyword is not registered in the taste information list (i.e., has not been registered therein yet), control proceeds to step S32.

At step S32, the taste learning section 37 registers, as taste information representing the taste of the user, the learning-use keyword and the taste degree for the learning-use keyword, which represents the degree of the taste of the user therefor, in the taste information list, and supplies the resulting taste information list to the taste information storage section 38 so that the former taste information list is overwritten with the new taste information list therein. Thus, the taste information list learning process is completed.

Meanwhile, if the taste learning section 37 determines at step S31 that the learning-use keyword is registered in the taste information list (i.e., has already been registered therein), control proceeds to step S33.

At step S33, the taste learning section 37 updates the taste degree for the learning-use keyword already registered in the taste information list, and supplies the resulting taste information list to the taste information storage section 38 so that the former taste information list is overwritten with the new taste information list therein. Thus, the taste information list learning process is completed.

Figure 6:
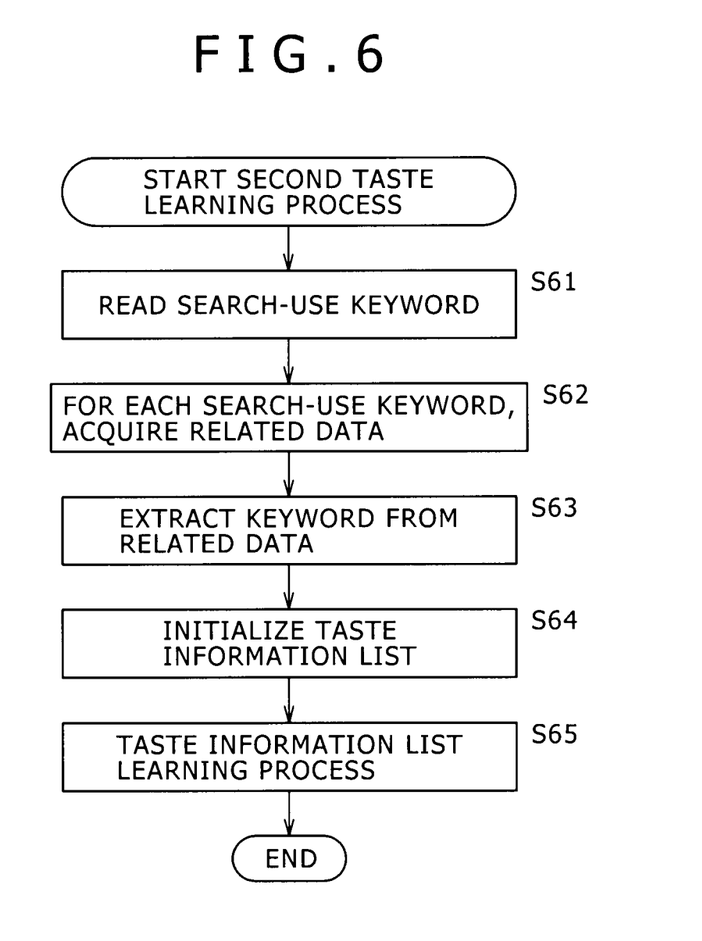
FIG. 6 is a flowchart illustrating a second taste learning process.

Next, referring to a flowchart of FIG. 6, a second taste learning process will now be described below.

In the second taste learning process, the taste information of the user is learned based on the keyword for which the taste degree is equal to or greater than the predetermined threshold out of the keywords registered in the taste information list generated by the prior learning via the first taste learning process, so that a new taste information list is generated.

When the user has operated the start button on the operation section 44, for example, the operation signal corresponding to the user operation is supplied from the operation section 44 to the control section 45, and the control section 45 controls the Web search section 39, the keyword extraction section 40, and the taste learning section 41 based on the operation signal supplied from the operation section 44 to perform the second taste learning process.

At step S61, the Web search section 39 reads, from the taste information storage section 38, as the search-use keyword, the keyword for which the taste degree of the user is equal to or greater than the predetermined threshold and which is registered in the taste information list generated by the prior learning via the first taste learning process.

At step S62, for each search-use keyword, the Web search section 39 acquires the related data related to that search-use keyword via the Internet 2, and supplies the acquired related data to the keyword extraction section 40.

At step S63, the keyword extraction section 40 extracts, from the related data supplied from the Web search section 39, a keyword(s) via the morphological analysis or the like, and supplies the extracted keyword(s) to the taste learning section 41 as the learning-use keyword.

After the keyword extraction section 40 has extracted all keywords from the supplied related data, and supplied all the keywords to the taste learning section 41 as learning-use keywords at step S63, control proceeds to step S64.

At step S64, the taste learning section 41 initializes the taste information list generated by the first taste learning process. Specifically, the taste learning section 41 deletes the keywords and the taste degrees registered in the taste information list generated by the first taste learning process.

At step S65, similarly to the taste learning section 37, the taste learning section 41 performs the taste information list learning process. Specifically, the taste learning section 41 learns the taste information representing the taste of the user based on each of the learning-use keyword(s) supplied from the keyword extraction section 40, and supplies a new taste information list obtained as a result of this learning to the taste information storage section 38 to be stored therein.

After the process of generating the taste information list based on all the learning-use keywords is performed in the above-described manner, the second taste learning process is completed.

In the second taste learning process (FIG. 6), of the keywords registered in the taste information list generated by the first taste learning process (FIG. 4), the keyword for which the taste degree is equal to or greater than the predetermined threshold is used as the search-use keyword to search for the related data related to that search-use keyword, and the new taste information list is generated based on the keyword(s) extracted from the retrieved related data.

Therefore, in comparison to the first taste learning process, where the taste information is learned based on the keyword extracted from the EPG data, the second taste learning process allows the taste information to be learned based on a greater number of keywords as extracted from the related data, and therefore allows more wide-ranging learning of the taste information of the user to be achieved based on the keyword(s) included in the related data.

In the case where the user has rarely performed the viewing of programs or the like, the taste information of the user cannot be learned sufficiently via the first taste learning process. Even in this case, however, the second taste learning process allows sufficient learning of the taste information of the user to be achieved using the keywords included in the related data acquired based on the search-use keyword.

This prevents insufficient learning of the taste information of the user and thereby prevents a situation where no or only a few recommended programs can be presented to the user, when recommended programs are presented to the user based on the new taste information list obtained by the second taste learning process.

According to the above-described embodiment, at step S62 in the second taste learning process, the Web search section 39 acquires the related data related to each search-use keyword via the Internet 2. Note, however, that in other embodiments of the present invention, the Web search section 39 may acquire the related data related to each search-use keyword from a related data storage medium in which the related data related to the search-use keywords are recorded (stored), for example.

According to the above-described embodiment, at step S64 in the second taste learning process, the taste information list generated by the first taste learning process is initialized, i.e., the keywords and the taste degrees registered therein are deleted, and at step S65, the keywords and so on are registered in the initialized taste information list to generate the new taste information list. Note, however, that this is not important to the embodiments of the present invention.

For example, in other embodiments of the present invention, while the initialization of the taste information list generated by the first taste learning process is omitted at step S64, at step S65, a different taste information list may be generated as the new taste information list and supplied to the taste information storage section 38 to be stored therein. In this case, since the process of step S64 is omitted, the second taste learning process can be completed more quickly.

Further, according to the above-described embodiment, the second taste learning process is initiated when the user has operated the start button on the operation section 44. Note, however, that in other embodiments of the present invention, the second taste learning process may be started at predetermined times as appropriate, regardless of the user operation, for example.

According to the above-described embodiment, the program recommendation section 42 allows the display section 43 to display the detailed information about the recommended program and so on based on the new taste information list obtained by the second taste learning process. Note, however, that in other embodiments of the present invention, the detailed information about the recommended program and so on may be outputted, as audio data, via a loudspeaker (not shown).

According to the above-described embodiment, the program recommendation section 42 allows the display section 43 to display the detailed information about the recommended program and so on based on the new taste information list generated by the second taste learning process. Note, however, that in other embodiments of the present invention, based on the new taste information list generated by the second taste learning process, the display/recording processing section 34 may supply the recommended program to the recorded program storage section 35 as appropriate to be stored therein as a recorded program, for example.

Embodiments of the present invention are applicable to information processing apparatuses such as a hard disk recorder designed to store or record programs, a television receiver designed to receive programs via a network such as the Internet or an antenna, and so on, for example.

The above-described series of processes can be implemented either by dedicated hardware or software. In the case where the series of processes is implemented by software, a program that forms the software is installed from a storage medium into a so-called built-in computer or a general-purpose personal computer that, when various programs are installed thereon, becomes capable of performing various functions, for example.

Figure 7:
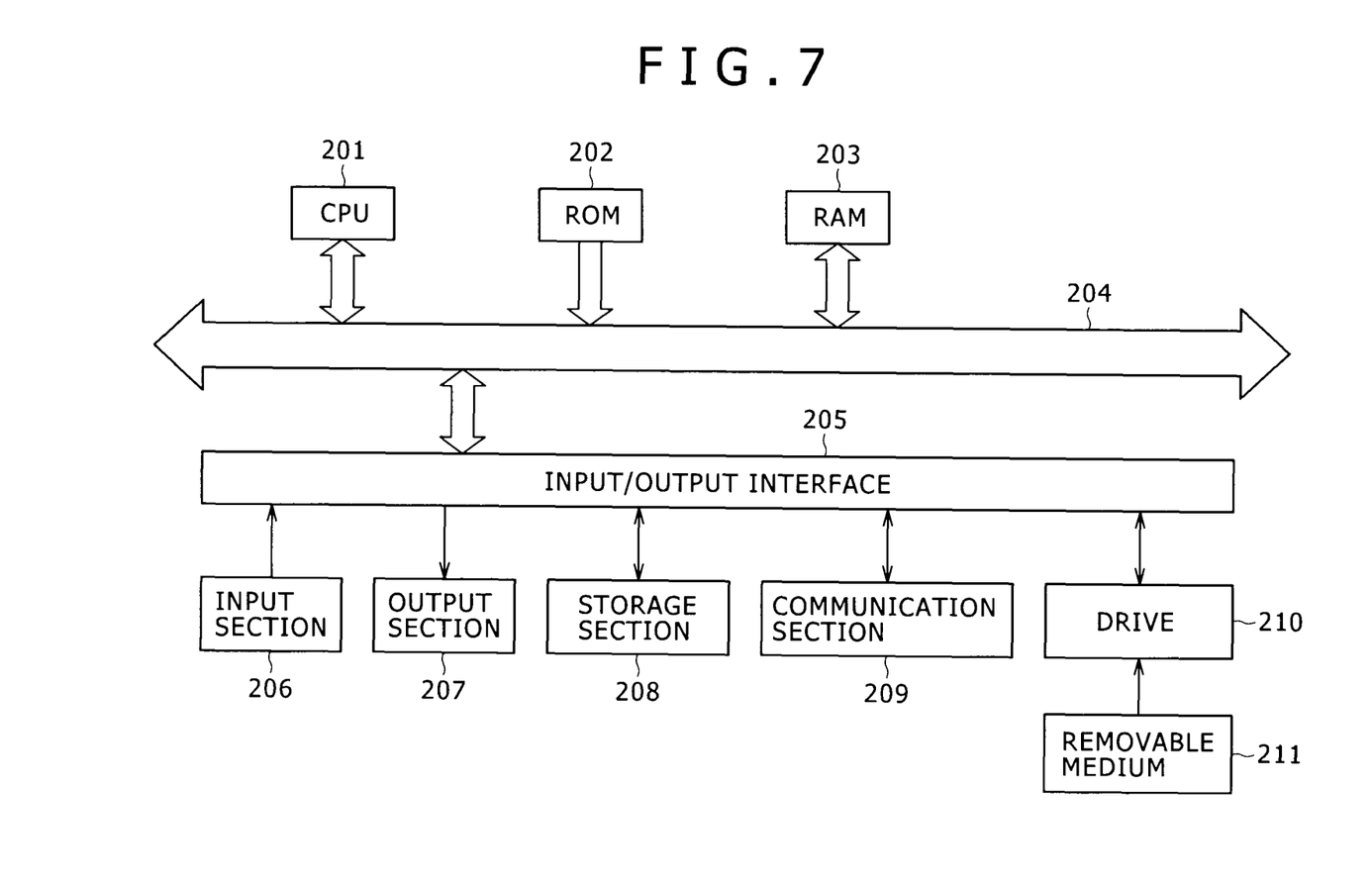
FIG. 7 is a block diagram illustrating an exemplary structure of a computer.

FIG. 7 illustrates an exemplary structure of a computer that implements the above-described series of processes via the program.

A central processing unit (CPU) 201 performs various processes in accordance with the program stored in a read-only memory (ROM) 202 or a storage section 208. The program executed by the CPU 201, data, and so on are stored in a random access memory (RAM) 203 as appropriate. The CPU 201, the ROM 202, and the RAM 203 are connected to one another via a bus 204.

An input/output interface 205 is also connected to the CPU 201 via the bus 204. To the input/output interface 205 are connected: an input section 206 formed by a keyboard, a mouse, a microphone, and so on; and an output section 207 formed by a display, a loudspeaker, and so on. The CPU 201 performs the various processes in accordance with instructions inputted via the input section 206. Then, the CPU 201 outputs results of the processes to the output section 207.

The storage section 208, which is connected to the input/output interface 205, is formed by a hard disk, for example, and stores the program to be executed by the CPU 201 and various other data. A communication section 209 communicates with an external device via the network such as the Internet or a local area network.

Note that the program may be acquired via the communication section 209 and stored in the storage section 208.

A drive 210 is connected to the input/output interface 205. When a removable medium 211 such as a magnetic disk, an optical disc, a magneto-optical disk, or a semiconductor memory is loaded on the drive 210, the drive 210 drives the removable medium 211 to acquire a program, data, or the like recorded thereon. The program or data acquired is transferred to the storage section 208 and stored therein as necessary.

Referring to FIG. 7, the storage medium for recording (storing) the program to be installed into the computer so as to be executable by the computer is formed by: the removable medium 211, which is a packaged medium such as the magnetic disk (including a flexible disk), the optical disc (including a compact disc-read-only memory (CD-ROM) and a digital versatile disc (DVD)), the magneto-optical disk (including a Mini-Disc (MD)), or the semiconductor memory; the ROM 202, in which the program is stored temporarily or permanently; the hard disk forming the storage section 208; or the like. The program is recorded on the storage medium as necessary using a wired or wireless communication medium, such as the local area network, the Internet, or digital satellite broadcasting, via the communication section 209, which is an interface such as a router or a modem.

Note that the steps implemented by the program stored in the storage medium and described in the present specification may naturally be performed chronologically in order of description but may not necessarily be performed chronologically. Some steps may be performed in parallel or independently of one another.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2008-154836 filed in the Japan Patent Office on Jun. 13, 2008, the entire content of which is hereby incorporated by reference.

What is claimed is:

1. An information processing apparatus, comprising:
generation means for generating a taste information list including keywords representing taste of a user, the list of keywords being extracted from Electronic Programming Guide (EPG) information based on a viewing history of a user;
acquisition means for selecting a keyword included in the taste information list, the keyword being selected only if the keyword has an associated taste degree equal to or greater than a predetermined threshold, and acquiring related data related to the identified keyword, the taste degree representing how many times an associated keyword has been extracted from EPG data associated with programming selected by the user;
extraction means for extracting a related keyword not included in the taste information list from the acquired related data;
learning means for adding and storing the related keyword to the taste information list; and
presentation means for presenting a recommended program to the user based on the related keyword.

2. The information processing apparatus according to claim 1, wherein the learning means deletes the keywords included in the taste information list prior to adding the related keyword and other keywords extracted by the extraction means to the taste information list.

3. The information processing apparatus according to claim 1, wherein the extraction means extracts more than two related keywords not included in the taste information list from the acquired related data.

4. The information processing apparatus according to claim 1, wherein the presentation means presents the recommended program to the user by performing a search using the related keyword.

5. An information processing method employed in an information processing apparatus that learns taste information representing taste of a user, the method comprising:
generating a taste information list including keywords representing taste of a user, the list of keywords being extracted from Electronic Programming Guide (EPG) information based on a viewing history of a user;
selecting a keyword included in the taste information list, the keyword being selected only if the keyword has an associated taste degree equal to or greater than a predetermined threshold, the taste degree representing how many times an associated keyword has been extracted from EPG data associated with programming selected by the user;
acquiring related data related to the identified keyword;
extracting a related keyword not included in the taste information list from the acquired related data;
adding and storing the related keyword to the taste information list; and
presenting a recommended program to the user based on the related keyword.

6. The information processing method according to claim 5, further comprising deleting the keywords included in the taste information list prior to adding the related keyword and other keywords extracted by the extracting to the taste information list.

7. The information processing method according to claim 5, wherein the extracting includes extracting more than two related keywords not included in the taste information list from the acquired related data.

8. A non-transitory computer readable storage medium storing computer instructions to be executed by a computer, the computer instructions, when executed by the computer, cause the computer to perform a method comprising:
generating a taste information list including keywords representing taste of a user, the list of keywords being extracted from Electronic Programming Guide (EPG) information based on a viewing history of a user;
selecting a keyword included in the taste information list, the keyword being selected only if the keyword has an associated taste degree equal to or greater than a predetermined threshold, the taste degree representing how many times an associated keyword has been extracted from EPG data associated with programming selected by the user;
acquiring related data related to the identified keyword;
extracting a related keyword not included in the taste information list from the acquired related data;
adding and storing the related keyword to the taste information list; and
presenting a recommended program to the user based on the related keyword.

9. The non-transitory computer readable storage medium according to claim 8, further comprising deleting the keywords included in the taste information list prior to adding the related keyword and other keywords extracted by the extracting to the taste information list.

10. The non-transitory computer readable storage medium according to claim 8, wherein the extracting includes extracting more than two related keywords not included in the taste information list from the acquired related data.

11. An information processing apparatus, comprising:
circuitry configured to
generate a taste information list including keywords representing taste of a user, the list of keywords being extracted from Electronic Programming Guide (EPG) information based on a viewing history of a user;
select a keyword included in the taste information list, the keyword being selected only if the keyword has an associated taste degree equal to or greater than a predetermined threshold, and to acquire related data related to the identified keyword, the taste degree representing how many times an associated keyword has been extracted from EPG data associated with programming selected by the user;
extract a related keyword not included in the taste information list from the acquired related data;
add and store the related keyword to the taste information list; and
present a recommended program to the user based on the related keyword.

12. The information processing apparatus according to claim 11, wherein the circuitry is configured to acquire the related data by performing an Internet search on the identified keyword.

13. The information processing apparatus according to claim 11, wherein the related data is text data of an Internet page related to the identified keyword.

14. The information processing apparatus according to claim 11, wherein the circuitry is configured to delete the keywords included in the taste information list prior to adding the related keyword and other extracted keywords to the taste information list.

15. The information processing apparatus according to claim 11, wherein the circuitry is configured to extract more than two related keywords not included in the taste information list from the acquired related data.

16. An information processing apparatus, comprising:
circuitry configured to
generate a taste information list including keywords representing taste of a user, the list of keywords being extracted from Electronic Programming Guide (EPG) information based on a viewing history of a user;
select a keyword included in the taste information list, the keyword being selected only if the keyword has an associated taste degree equal to or greater than a predetermined threshold and to acquire related data related to the identified keyword, the taste degree representing how many times an associated keyword has been extracted from EPG data associated with programming selected by the user;
identify a related keyword not included in the taste information list based on the acquired related data;
extract the related keyword from the acquired related data; and
add and store the related keyword to the taste information list; and
present a recommended program to the user based on the related keyword.

17. The information processing apparatus according to claim 16, wherein the circuitry is configured to extract more than two related keywords not included in the taste information list within the acquired related data.

* * * * *